United States Patent
Dell et al.

(10) Patent No.: US 9,682,621 B2
(45) Date of Patent: Jun. 20, 2017

(54) DECOUPLER

(71) Applicant: LITENS AUTOMOTIVE PARTNERSHIP, Woodbridge (CA)

(72) Inventors: James W. Dell, Newmarket (CA); John R. Antchak, Aurora (CA)

(73) Assignee: LITENS AUTOMOTIVE PARTNERSHIP, Woodbridge, ON (CA)

( * ) Notice: Subject to any disclaimer, the term of this patent is extended or adjusted under 35 U.S.C. 154(b) by 187 days.

(21) Appl. No.: 14/653,380

(22) PCT Filed: Jan. 31, 2014

(86) PCT No.: PCT/CA2014/000077
§ 371 (c)(1),
(2) Date: Jun. 18, 2015

(87) PCT Pub. No.: WO2014/117261
PCT Pub. Date: Aug. 7, 2014

(65) Prior Publication Data
US 2015/0316138 A1    Nov. 5, 2015

Related U.S. Application Data

(60) Provisional application No. 61/759,092, filed on Jan. 31, 2013.

(51) Int. Cl.
*F16H 55/36* (2006.01)
*F16D 3/12* (2006.01)
(Continued)

(52) U.S. Cl.
CPC ............... *B60K 25/02* (2013.01); *F16D 3/12* (2013.01); *F16D 13/76* (2013.01); *F16D 41/206* (2013.01);
(Continued)

(58) Field of Classification Search
CPC ......... B60K 25/02; F16D 7/022; F16D 13/12; F16D 13/76; F16D 41/206; F16D 41/20;
(Continued)

(56) References Cited

U.S. PATENT DOCUMENTS 6,044,943 A * 4/2000 Bytzek .................... F16D 41/20
192/212
7,624,852 B2 * 12/2009 Mevissen ................ F16D 7/022
192/41 S
(Continued)

FOREIGN PATENT DOCUMENTS

WO      9612122 A1    4/1996
WO   2004070225 A1    8/2004
(Continued)

OTHER PUBLICATIONS

Search Report and Written Opinion for PCT/CA2014/000077, Apr. 29, 2014, ISA.
(Continued)

*Primary Examiner* — William E Dondero
*Assistant Examiner* — Robert T Reese
(74) *Attorney, Agent, or Firm* — Milman IP Inc.

(57) ABSTRACT

In an aspect, a decoupler is provided, and included a driver having a clutch surface a hub that is disposed within the driver, and at least one torsionally-compliant member and a wrap spring clutch that are disposed in series between the hub and the clutch surface. The driver comprises a pulley and a cover that is received into a cavity in the pulley. The pulley has a belt-engagement surface and is fixedly coupled to the cover for rotation therewith. The cover defines the clutch surface.

15 Claims, 11 Drawing Sheets

(51) Int. Cl.
- *F16D 41/20* (2006.01)
- *B60K 25/02* (2006.01)
- *F16D 13/76* (2006.01)
- *F02B 67/06* (2006.01)

(52) U.S. Cl.
CPC .............. *F16H 55/36* (2013.01); *F02B 67/06* (2013.01); *F16D 2300/06* (2013.01); *F16H 2055/366* (2013.01)

(58) Field of Classification Search
CPC ...... F16D 43/04; F16D 2300/06; F16H 55/36; F16H 2005/366; F02B 67/06
See application file for complete search history.

(56) References Cited

U.S. PATENT DOCUMENTS

| | | | |
|---|---|---|---|
| 2010/0294608 A1 | 11/2010 | Stadele | |
| 2011/0315502 A1* | 12/2011 | Antchak | F16D 7/022 192/75 |
| 2013/0161150 A1* | 6/2013 | McCrary | F16D 43/04 192/41 R |
| 2014/0329631 A1* | 11/2014 | Mevissen | F02B 67/06 474/166 |

FOREIGN PATENT DOCUMENTS

| WO | 2005028899 A1 | 3/2005 |
|---|---|---|
| WO | 2010099605 A1 | 9/2010 |
| WO | 2013090510 A1 | 6/2013 |

OTHER PUBLICATIONS

International Preliminary Report on Patentability for PCT/CA2014/000077, Aug. 13, 2015.

* cited by examiner

DECOUPLER

CROSS-REFERENCE TO RELATED APPLICATIONS

This application claims priority to and the benefit of U.S. Provisional Patent Application No. 61/759,092 filed Jan. 31, 2013, the contents of which are incorporated herein in their entirety.

FIELD

The present disclosure relates to a decoupler.

BACKGROUND

Examples of known decouplers are described in WIPO Publication Nos. WO2004/070225, WO2005/028899 and WO2010/099605. While such decouplers are satisfactory for their intended use, such decouplers are nonetheless susceptible to improvement.

SUMMARY

This section provides a general summary of the disclosure, and is not a comprehensive disclosure of its full scope or all of its features.

In one form, the present teachings provide a decoupler that includes a driver that has a clutch surface, a hub that is disposed within the driver, at least one torsionally-compliant member and a wrap spring clutch that are disposed in series between the hub and the clutch surface. The driver can include a pulley and a cover that is received into a cavity in the pulley. The pulley has a belt engagement surface and is fixedly coupled to the cover for rotation therewith. The cover defines the clutch surface.

In another form, the present teachings provide a decoupler that includes a driver, a hub disposed within the driver, a lubricant and a plurality of vanes, a torsionally-compliant member and a one-way clutch. The isolator is disposed in a torque path between the driver and the hub. The one-way clutch permits rotary power to be transferred from one of the driver and the hub to the other one of the driver and the hub in a first rotary direction. The one-way clutch also permits the other one of the driver and the hub to overrun the one of the driver and the hub in the first rotary direction. The vanes are coupled to the one of the driver and the hub for rotation therewith and are configured to circulate the lubricant in a radially inward direction when the one of the driver and the hub overruns the other one of the driver and the hub in the first rotary direction.

In still another form, the present teachings provide a decoupler that includes a driver, a hub, a first hub spacer, a bearing, a plurality of arcuate springs and a one-way clutch in series with the arcuate springs. The hub has a hub body and a plurality of hub tabs. The first hub spacer is configured to be fixed to a first end of the hub for common rotation therewith. Each of the arcuate springs has a first end, which is abutted against a corresponding one of the hub tabs, and a second end that abuts an input member of the one-way clutch. The one way clutch is configured to permit rotary power to be transferred from the hub to the driver in a first rotary direction. The one-way clutch also is configured to permit the driver to overrun the hub in the first rotary direction. The bearing supports the driver relative to the first hub spacer. The hub tabs extend axially and radially outwardly from the hub body. The bearing is radially in-line with the arcuate springs and the hub tabs.

In yet another form, the present teachings provide a decoupler that includes a driver that defines a clutch surface, a hub that is disposed within the driver, a torsionally-compliant member and a one-way clutch that are disposed in series in a torque path between the hub and the driver. The one-way clutch permits rotary power to be transferred from one of the driver and the hub to the other one of the driver and the hub in a first rotary direction. The one-way clutch also permits the other one of the driver and the hub to overrun the one of the driver and the hub in the first rotary direction. The one-way clutch having a carrier assembly, a wrap spring clutch and a spring limiter. The wrap spring clutch is formed of wire and has a first end, a plurality of helical coils, and a second end that is opposite the first end. The first end is coupled to the carrier assembly for rotation therewith. The plurality of helical coils is engaged to the clutch surface. The spring limiter is configured to limit axial elongation of the wrap spring clutch by limiting movement of the second end of the wrap spring clutch. The spring limiter is non-rotatably but axially movably coupled to the carrier assembly. A plurality of latch mechanisms couple the spring limiter to the carrier assembly.

In yet another form, the present teachings provide a method of forming a hub assembly, including:

a. stamping a hub that includes a hub body that defines a plane and that defines an aperture, and at least one hub tab that extends from the plane of the hub body at a selected angle;

b. turning a hub spacer from a piece of bar; and c. fixedly joining the hub and the hub spacer together, such that the hub spacer extends through the aperture in the hub.

In yet another form, the present teachings provide a decoupler including a driver having a clutch surface, a hub that is disposed within the driver, and at least one arcuate spring and a wrap spring clutch that are disposed in series between the hub and the clutch surface. The at least one arcuate spring has a generally circular cross-sectional shape and having a center axis. The hub includes a hub body defining a plane and at least one hub tab extending away from the plane at an angle that is less than 90 degrees. Each hub tab extends across an axial end of a corresponding one of the at least one arcuate spring along a path that intersects the center axis of the corresponding one of the at least one arcuate spring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
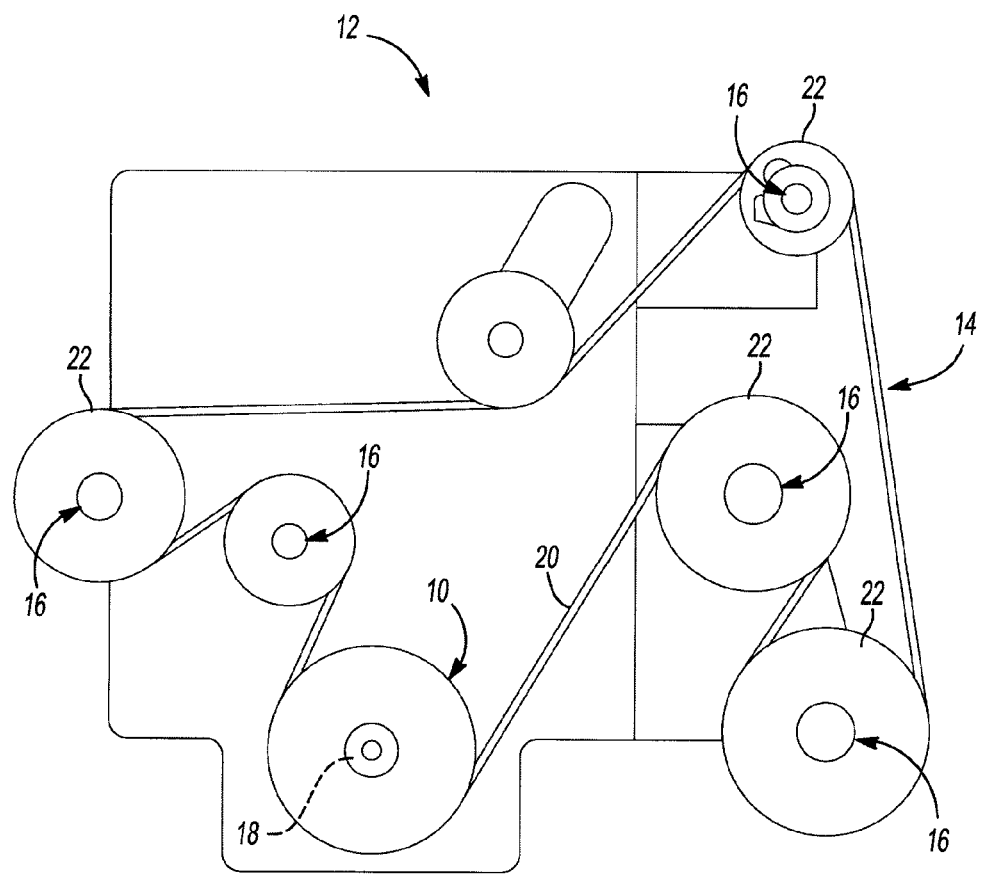
FIG. 1 is a schematic illustration of a decoupler constructed in accordance with the teachings of the present disclosure in operative association with an exemplary engine.

With reference to FIG. 1 of the drawings, a decoupler constructed in accordance with the teachings of the present disclosure is generally indicated by reference numeral 10. The decoupler 10 is shown in operative association with an automotive engine 12 that can include an accessory drive 14 having a plurality of engine accessories 16. In the particular example provided, the decoupler 10 is coupled to an input member (e.g., crankshaft) 18 of the engine 12 and transmits rotary power via an endless power transmitting element 20, such as a belt or a chain, to output members, such as pulleys or sprockets, to drive the engine accessories 16. It should be appreciated that while the decoupler 10 is illustrated in association with a front engine accessory drive, a decoupler constructed in accordance with the teachings of the present disclosure may be incorporated into various other devices in which a driven load is able at times to overspeed a source of rotary power. Consequently, it will be understood that the teachings of the present disclosure are not limited to embodiments wherein the output member is, for example, a pulley, sprocket, or gear that transmits rotary power from a crankshaft to an endless power transmitting element (e.g., belt, chain, gear teeth), but could alternatively be incorporated into embodiments wherein an input member (e.g., pulley, sprocket, gear) receives rotary power from the endless power transmitting element and transfers it to a shaft of a driven load.

Figure 2:
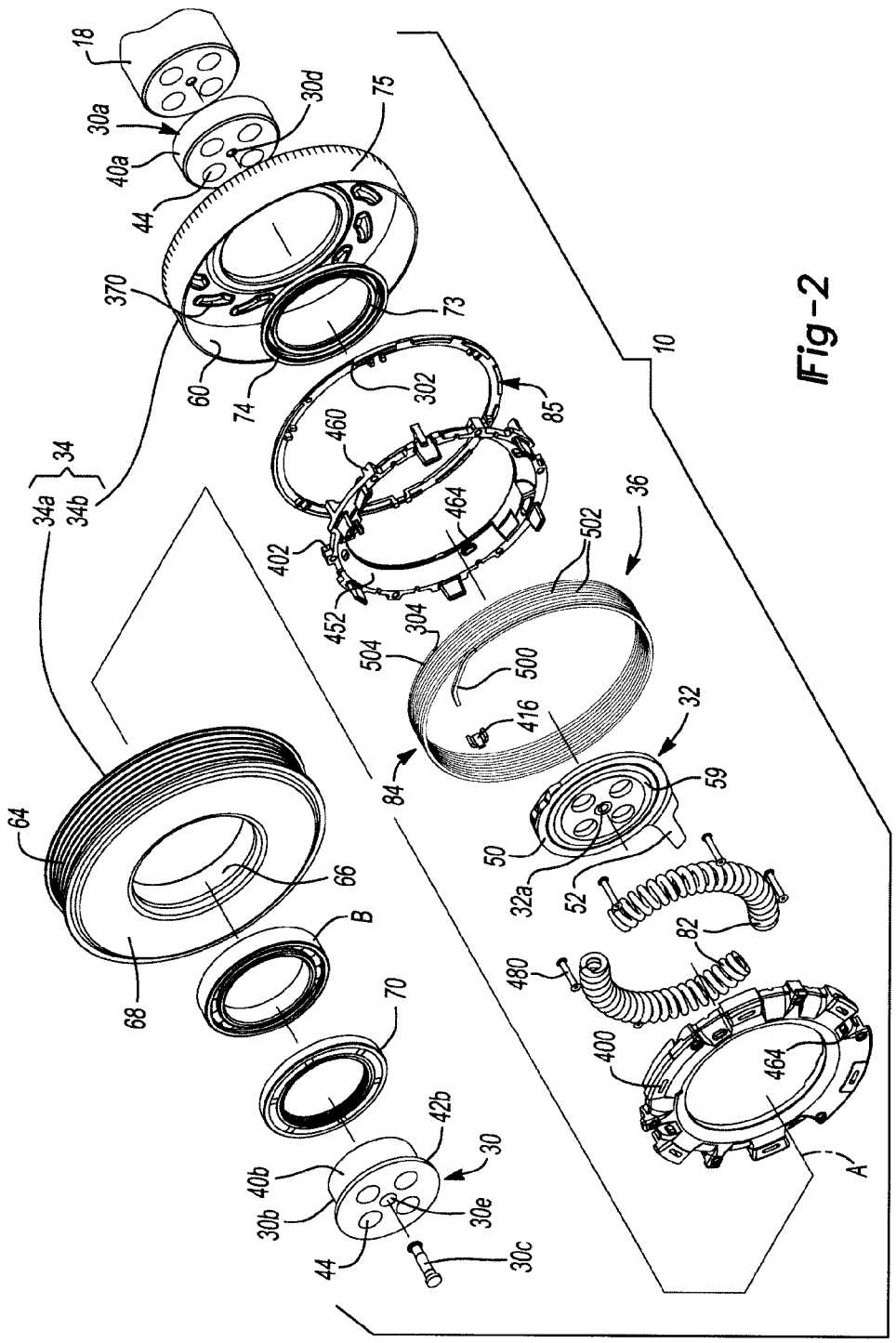
FIG. 2 is an exploded perspective view of the decoupler of FIG. 1.
Figure 3:
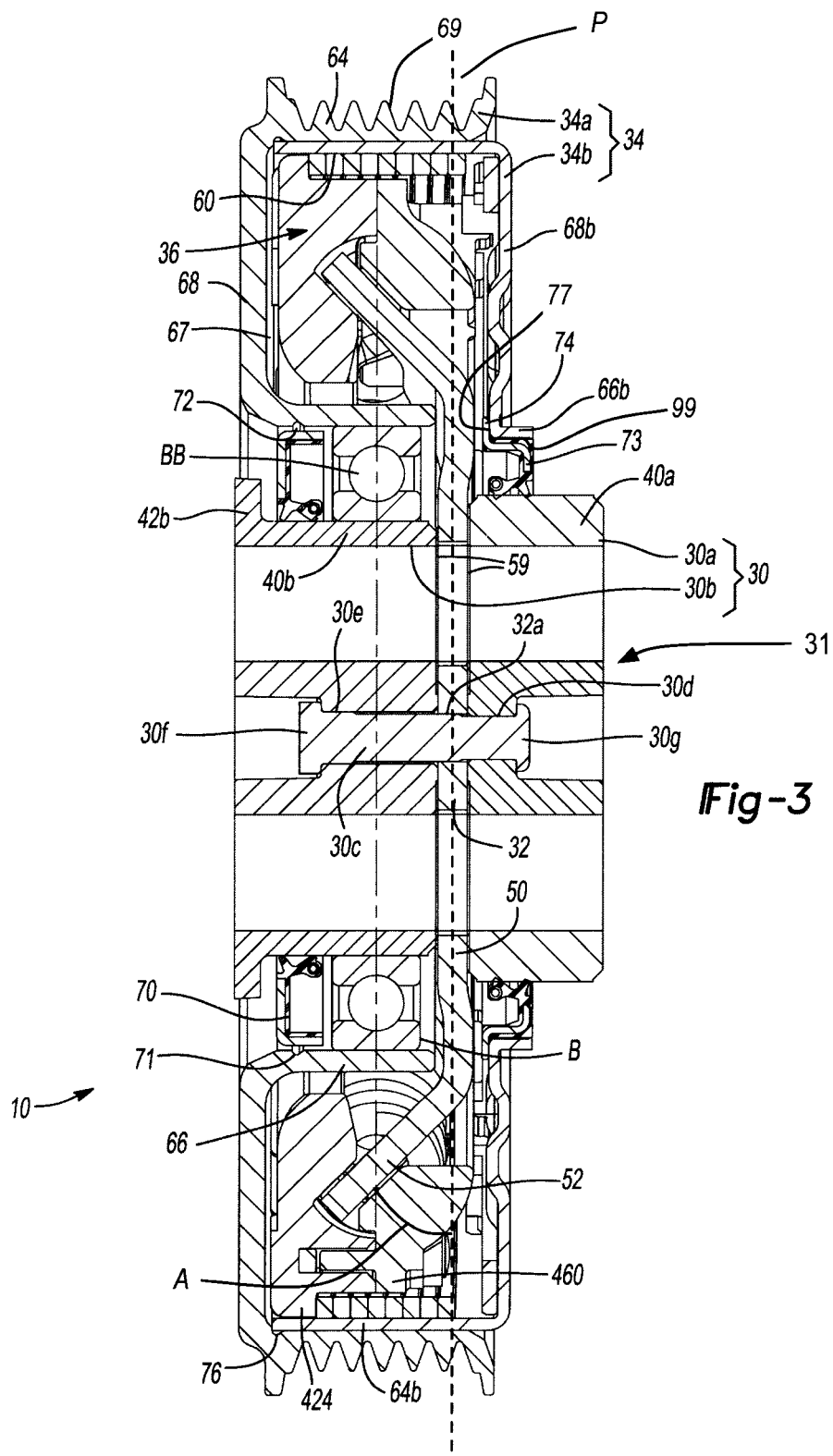
FIG. 3 is a sectional view of the decoupler of FIG. 1 taken through hub tabs of a hub that is part of the decoupler.

With reference to FIGS. 2 and 3, the decoupler 10 can be rotatable about an axis A and can include a hub 32, a driver 34 and a decoupling sub-assembly 36. In the embodiment shown in FIGS. 2 and 3 the hub 32 is an input member, and the driver 34 is an output member. The hub 32 may be connected to a hub spacer 30 to form a hub assembly 31. The hub spacer 30 can comprise a first spacer portion 30a, a second spacer portion 30b and a retainer 30c. The first spacer portion 30a can be abutted against an axial end of the crankshaft 18 and may be employed, if necessary, to obtain a desired axial spacing between the crankshaft 18 and a first side of the hub 32. The second spacer portion 30b can be disposed against a second, opposite side of the hub 32 and can be employed to obtain a desired axial spacing between the hub 32 and a torsional vibration damper (not shown). The first and second spacer portions 30a and 30b can be formed of any desired material and in any desired manner, such as turning or via the compacting and sintering of a powdered metal material. The retainer 30c can be any desired means for securing the first and second spacer portions 30a and 30b to the hub 32, such as one or more threaded fasteners (not shown) or welds (not shown). In the particular example provided, the retainer 30c is a pin that is disposed through 30 alignment holes 30d, 32a and 30e in the first spacer portion 30a, the hub 32 and the second spacer portion 30b, respectively. The retainer 30c can have a head 30f that can be abutted against the second spacer portion 30b and an opposite end 30g of the retainer 30c can be received through the hub 32 and the first spacer portion 30a and deformed to inhibit or limit relative axial movement between the first and second spacer portions 30a and 30b. In the example provided, a compressive load is applied to the first and second spacer portions 30a and 30b and the hub 32 while the end 30g of the retainer 30c is deformed so that the retainer 30c maintains a load on the assembly that clamps the first and second spacer portions 30a and 30b to the hub 32.

Each of the first and second spacer portions 30a and 30b can include an annular spacer body 40a and 40b, respectively, and the second spacer portion 30b can include an annular spacer flange 42b that can extend radially outwardly from the spacer body 40b. One or more bolt holes 44 can be formed through the first and second spacer portions 30a and 30b and if desired, one or more mating keying features may be coupled to, formed in or formed by the first and second spacer portions 30a and 30b and can be employed to maintain a predetermined rotational orientation of the hub spacer 30 relative to the hub 32, the torsional vibration damper (not shown) and/or the crankshaft 18.

Figure 15A:
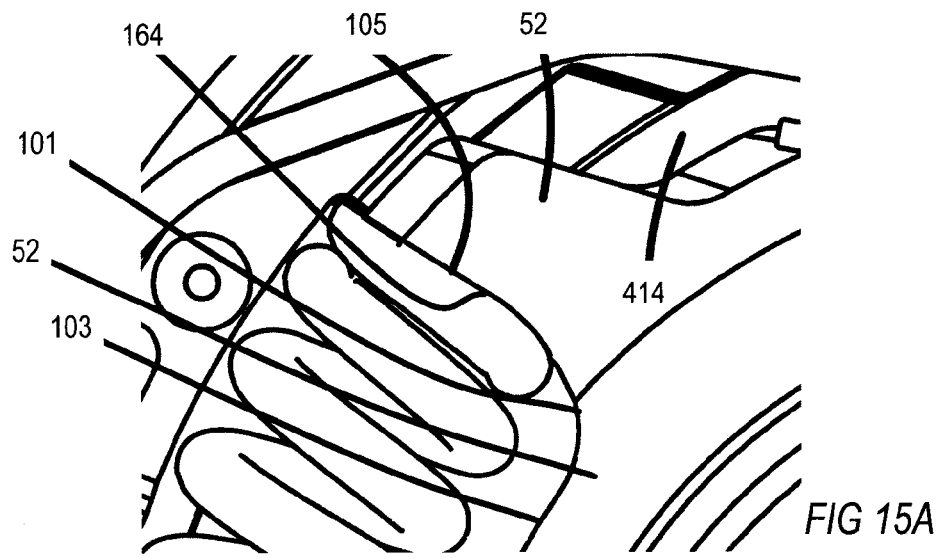
FIG. 15A is a highly magnified view of a portion of the assembly shown in FIG. 8.
Figure 15B:
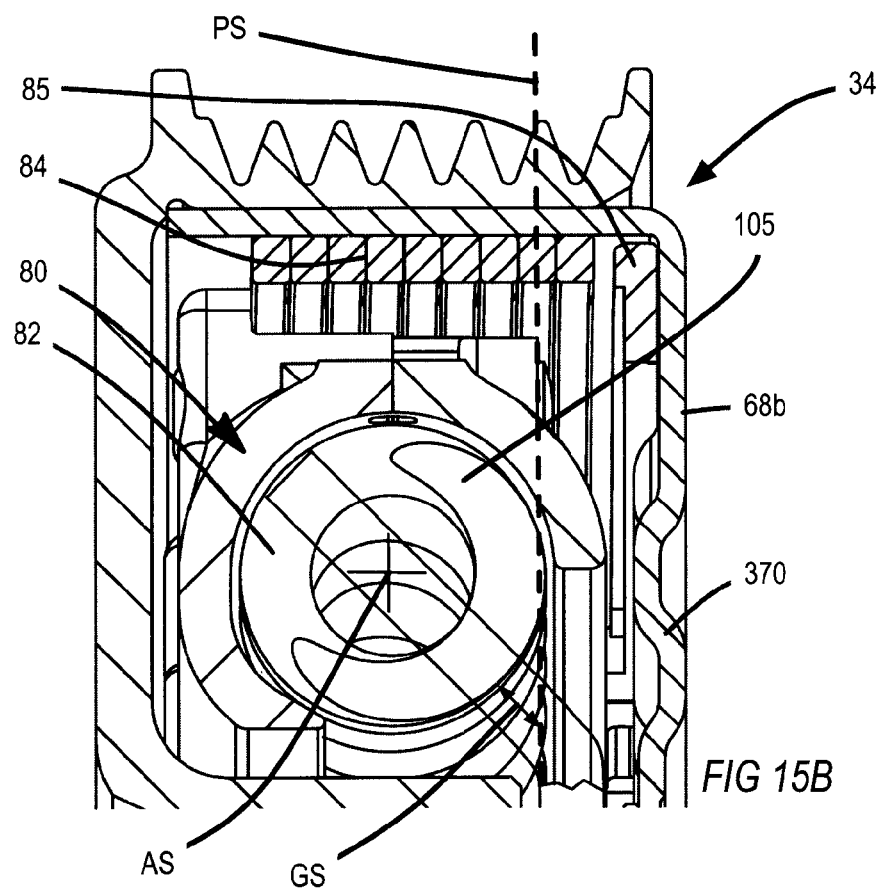
FIG. 15B is a magnified sectional elevation view of a portion of the decoupler as shown in FIG. 4.
Figure 15C:
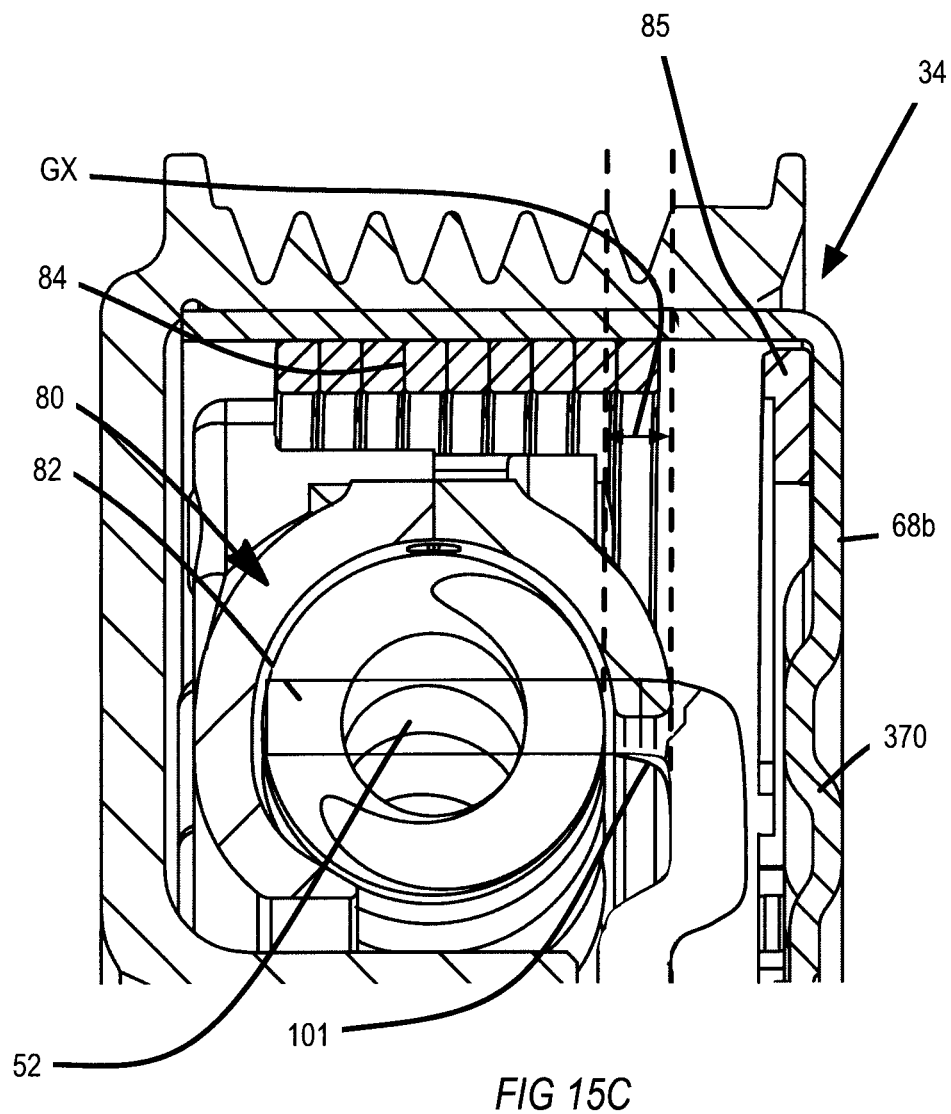
FIG. 15C is a magnified sectional elevation view of a portion of a variant of the decoupler shown in FIG. 4, with an alternative hub positioned in an alternative driver.

The hub 32 can comprise an annular hub body 50 and a pair of hub tabs 52 that can extend radially outwardly from the hub body 50. The hub 32 can be formed of one or more components in any manner desired (e.g., stamping) and from any suitable desired material. In the example provided, the hub tabs 52 extend axially and radially outwardly from the hub body 50 at a selected angle A which may be, for example, approximately 45 degrees. In some embodiments, in order to withstand the stresses incurred during use, the thickness of the hub body 50 may be about 3.5 mm. By forming the hub tabs 52 at a selected angle A that is less than 90 degrees from the hub body 50, and that is preferably at about 45 degrees from the plane of the hub body 50, the axial length of the driver 34 can be reduced, relative to a driver that contains a hub with tabs that extend at 90 degrees to the plane of the hub body. The reason for this can be seen with reference to FIGS. 15A-15C. As can be seen in FIG. 15A, there is a radiused corner, shown at 101, between the peripheral edge of the hub body 50 (shown at 103) and the edge of the hub tab 52 that forms the driving surface 164 (which engages axial end 105 of the spring 82). The radiusing serves to reduce stresses at the corner 101, thereby reducing the risk of failure of the hub 32. As can be seen in FIG. 15C, because the hub body 50 is axially so close to the spring 82, if the hub body 50 extended radially all the way out to the axis of the spring 82 (shown at AS), then there would have to be a certain amount of axial spacing between the spring 82 and the hub body 50 to provide clearance for the radiused corner 101. The axial spacing is shown at GX. This axial spacing GX directly impacts the axial length of the driver 34. By contrast, as shown in FIG. 15B, by extending the hub tab 52 at 45 degrees, the radiused corner 101 (not visible in FIG. 15B) can fit in the gap shown at GS that exists between the spring 82, which has a circular cross sectional shape, and the plane PS representing the surface of the hub body 50. As can be seen in FIG. 15B, the hub tab 52 extends substantially all the way across the axial end 105 of the spring 82 and passes through the center axis of the spring 82 shown at AS, so that the forces exerted between it and the spring 82 are relatively balanced across the axial end 105 of the spring 82. As a result of fitting the radiused corner 101 in the gap GS, the axial length of the driver 34 is not impacted and can remain compact. In FIG. 15b, it will be noted that the hub tab 52 is shown in outline only and is shown as transparent, to better show components behind it. It will be understood that, while an angle of 45 degrees for the hub tab 52 is advantageous because the gap GS between the spring 82 and the plane PS is large, thereby permitting a relatively large radiused corner 101, the angle of the hub tab 52 could be some other suitable angle while still permitting the radiused corner 101 to fit in the gap GS. In general, a compact axial length for the driver 34 is achieved when the angle of the hub tab 52 is any suitable angle that is less than 90 degrees to the plane P of the hub body 50, while permitting a radiused corner 101 to be provided between the peripheral edge of the hub body 50 and the hub tab 52. In some embodiments of the invention, however, particularly where the axial length of the driver 34 is not critical the hub tab 52 may extend at 90 to the plane of the hub body 50.

Figure 6:
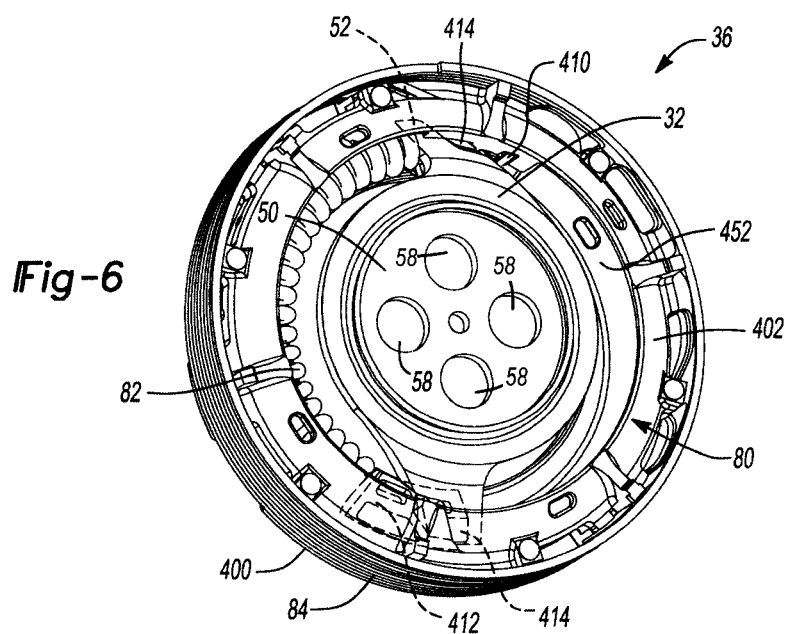
FIG. 6 is a rear perspective view of the decoupling sub-assembly.

Referring to FIG. 6, a plurality of holes 58 can be formed through the hub body 50 in a pattern that can mimic that of the holes 44 in the spacer body 40. Gaskets 59 can be coupled to the hub body 50 and can sealingly engage the abutting axial surfaces of the first and second spacer portions 30a and 30b. In the example provided, the gaskets 59 are formed of an elastomeric material that is overmolded onto (i.e., cohesively bonded to) the opposite axial surfaces of the hub body 50, but it will be appreciated that one or both of the gaskets 59 could be formed as a discrete component or via a sealing material that is dispensed onto one or more of the axial surfaces on the first and second spacer portions 30a and 30b and/or the hub body 50.

In some embodiments, the entirety of the hub 52 may be hardened via any suitable hardening process, such as nitriding.

With reference to FIGS. 2 and 3, the drive member 34 is configured to receive rotary power transmitted from the hub 32 through the decoupling sub-assembly 36 and can comprise a clutch surface 60 that can be drivingly engaged by the decoupling sub-assembly 36 to transmit rotary power therebetween. The clutch surface 60 may be heat treated and/or coated as desired. In the particular example provided, the clutch surface 60 is hardened via nitriding. The drive member 34 can comprise a pulley 34a and a cover 34b.

The pulley 34a can be formed in any desired manner, such as spinning, and can be formed of an appropriate material, such as a mild steel. The pulley 34a can include a circumferentially extending outer wall 64, a circumferentially extending inner wall 66, and an annular front wall 68 that can interconnect the outer and inner walls 64 and 66 and cooperate to form a cavity 67. The inner wall 66 can be concentric with the outer wall 64, but can extend axially rearward from the front wall 68 so as to be relatively shorter in the axial direction than the outer wall 64. An outside circumferentially extending surface of the outer wall 64 can be configured to engage the endless power transmitting element 20 (FIG. 1). In the example provided, the outside surface of the outer wall 64 is a belt engagement surface 69 that is configured to engage a poly-V drive belt. The pulley 34a can be finished in any desired manner, for example painted (e-coated) to inhibit corrosion and/or for aesthetics.

A seal and/or labyrinth can be employed to inhibit a lubricating fluid from leaving the cavity 67 between the second spacer portion 30b and the pulley 34a and/or to inhibit the ingress of moisture or debris into the cavity 67. In the example provided, a lip seal 70 is press-fit into engagement with the inner wall 66 and sealingly engaged to the spacer body 40b. If desired, a feature can be formed into the pulley 34a to help anchor the lip seal 70 in an axial direction relative to the pulley 34d. For example, the feature can comprise an annular groove 71 into which a portion of the lip seal 70 can be received to thereby form an annular rib 72 on the lip seal 70 that can help resist withdrawal of the lip seal 70 from the inner wall 66.

The cover 34b can be formed in any desired manner, such as stamping, and can be formed of a suitable material, such as a medium-strength steel that is hardened via nitriding. The cover 34b can include a circumferentially extending outer wall 64b, a circumferentially extending inner wall 66b, and an annular rear wall 68b that can interconnect the outer and inner walls 64b and 66b. The clutch surface 60 can be defined by an inside circumferentially extending surface of the outer wall 64b. The inner wall 66b can be concentric with the outer wall 64, but can extend axially rearward from the rear wall 68b, while the outer wall 64b can extend axially forward from the rear wall 68b. The cover 34b can be finished in any desired manner, for example painted (e-coated) to inhibit corrosion and/or for aesthetics. If desired, the coating can extend onto the interior surfaces of the cover 34b, including the clutch surface 60.

A seal and/or labyrinth can be employed to inhibit a lubricating fluid from leaving the cavity 67 through an aperture 99 in the rear wall 68b of the cover 34b and/or to inhibit the ingress of moisture or debris into the cavity 67 through the aperture 99. In the example provided, a lip seal 73 is press-fit into engagement with the inner wall 66b and sealingly engaged to the first spacer body 40a. The lip seal 73 can include a radial flange 74 that engages an inwardly-facing surface 77 of the rear wall 68b. The flange 74 prevents the lip seal 73 from being passed through the aperture formed by the wall 66b. To strengthen the flange 74, a metallic reinforcing member may be provided within the flange 74. When the cavity 67 is filled with lubricant, the pressure of the lubricant itself pushes the flange 74 to engage the wall 68b, which in turn inhibits the leakage of lubricant from the cavity 67.

In some embodiments, the lip seal 73 may be overmolded directly onto the cover 34b. In other embodiments, the lip seal 73 may be a separate component that is press-fit into the aperture defined by the inner wall 66b of the cover 34b. In such other embodiments, the lip seal 73 could be directly bonded to a portion of the cover 34b, such as to the inner wall 66b. In embodiments in which the lip seal 73 is not overmolded to the cover 34b, it is introduced into the cover 34b through the open front end of the cover 34b.

The cover 34b can be received into the cavity 67 in the pulley 34a and fixedly coupled to the pulley 34a such that rotary power can be transmitted from the cover 34b to the pulley 34a. Any desired means for coupling the cover 34b and the cavity 67 can be employed, such as one or more welds. In the particular example provided, the outer wall 64b is press-fit to the outer wall 64. If desired, a sealant and/or bonding agent can be disposed between the outer walls 64b and 64 to seal the interface between the outer walls 64b and 64 and/or more strongly secure the outer walls 64b and 64 to one another. Additionally or alternatively, a securing feature 75 can be formed onto one or both of the outer walls 64b and 64 to more strongly secure the outer walls 64b and 64 to one another. One securing feature can include, for example, at least one of knurls and reeding formed on the hardened outer wall 64b of the cover 34b that "bite into" the relatively softer material of the outer wall 64 of the pulley 34a. The knurling or reeding provided in the cover 34b is preferably provided at the end proximate the rear wall 68b, since the rear wall 68b makes this end of the cover 34b stronger (i.e. more resistant to radially compressive forces) than the open front end. As a result, the increased strength of the cover 34b in the region of the rear wall 68b increases the efficacy with which the knurls and/or reeds bite into the inner surface of the pulley 34a.

In an embodiment, however, it is possible to provide knurling and/or reeding on the open front end of the cover 34b, in addition to, or instead of, providing it at the rear end proximate the rear wall 68b.

However, regardless of where the knurling and/or reeding is provided, it is preferable for the knurling and/or reeding not to extend all the way across from one axial end to the other of the outer wall 64b, as this could provide a leakage path for lubricant from the interior to the exterior of the decoupler 10.

While the knurling and/or reeding may be evenly distributed about the circumference of the cover 34b, it is alternatively possible for the knurling and/or reeding to be provided in groupings that are spaced apart around the circumference of the cover 34b. In an embodiment, 12 such groupings of knurls and/or reeds may be provided about the circumference.

Using knurling and/or reeding on one of the pulley 34a and cover 34b for engagement with the other of the pulley 34a and cover 34b permits the cover 34b to be inserted into the cover 34a with sufficient grip to prevent rotational slip therebetween during use, without the need for additional measures such as the use of Loctite or the like. By eliminating the need for such measures, the assembly process of the cover 34b to the pulley 34a may be carried out more easily, without the handling and mess that can accompany the use of Loctite or the like.

While the terms 'front' and 'rear' have been used in relation to the radial walls and axial ends of the pulley 34a and cover 34b, it will be understood that these terms relate to the embodiment shown in the figures. It may be possible, for example to provide an embodiment in which the pulley 34a has a radial wall at the rear and a open front axial end, and for the cover 34b to be insertable into the open front end of the pulley 34a and to have a radial wall at the front and an open rear axial end.

A relief groove 76 can be formed between the outer wall 64 and the annular front wall 68. The relief groove 76 can provide a machined flat surface against which the cover 34b can abut. Stated another way, the relief groove 76 can provide a positive stop for the cover 34b when it is fitted into the pulley 34a. Moreover, the relief groove 76 can provide a space between the outer walls 64 and 64b into which paint debris can accumulate in the event that the outer walls 64 and 64b material, such as paint or a sealant, is scraped off as the cover 34b is installed to the pulley 34a.

Figure 4:
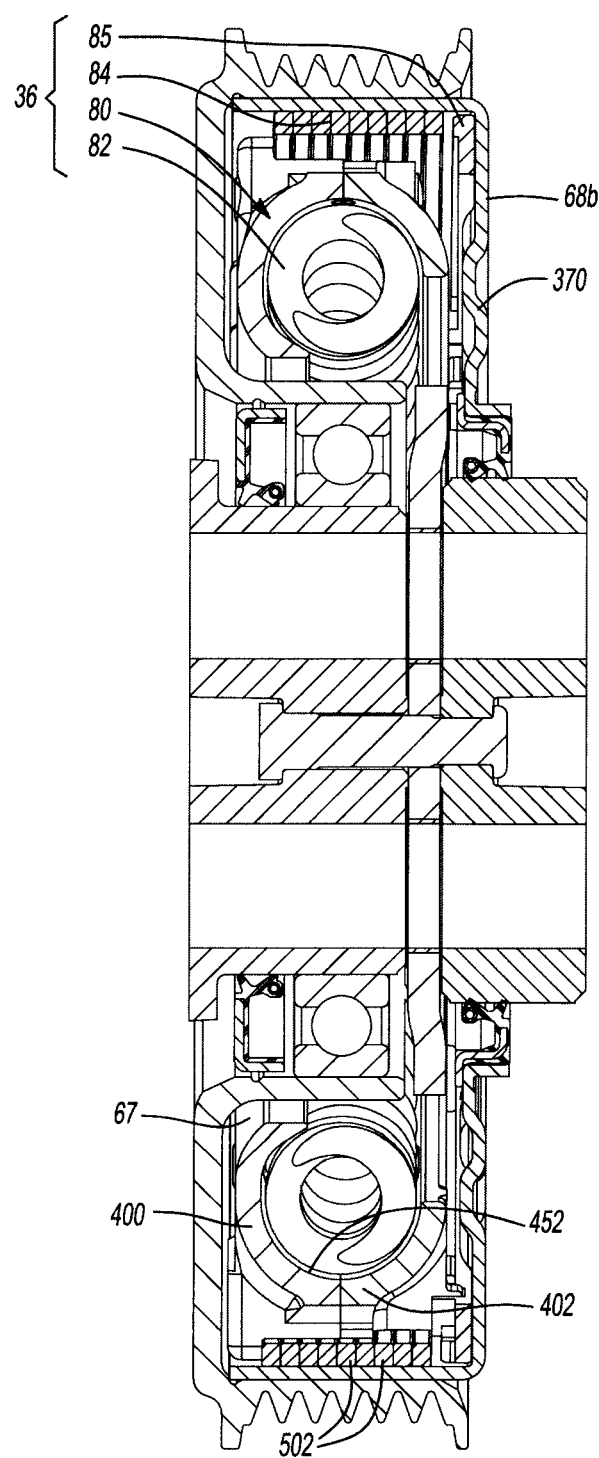
FIG. 4 is a sectional view of the decoupler of FIG. 1 taken through arcuate springs that are part of a decoupling sub-assembly in the decoupler.

With reference to FIGS. 2 and 4, the decoupling subassembly 36 can comprise at least one torsionally-compliant member and a one-way clutch that are disposed in series in a torque path between the hub 32 and the driver 34. The one-way clutch permits rotary power to be transferred from one of the driver 34 and the hub 32 to the other one of the driver 34 and the hub 32 in a first rotary direction. The one-way clutch also permits the other one of the driver 34 and the hub 32 to overrun the one of the driver 34 and the hub 32 in the first rotary direction. In the particular example provided, the at least one torsionally-compliant member comprises a plurality of arcuate helical coil springs 82, the one-way clutch comprises a carrier assembly 80, a wrap spring clutch 84 and a spring limiter 85, and the one-way clutch is configured to permit rotary power to be transferred from the hub 32 to the driver 34 in the first rotary direction and to permit the driver 34 to overrun the hub 32 in the first rotary direction.

Figure 5:
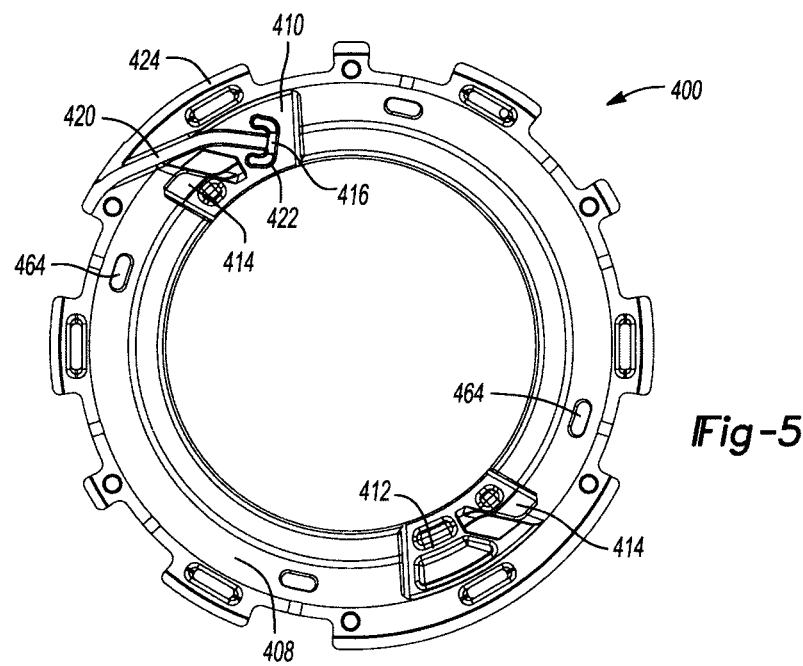
FIG. 5 is a front elevation view of a portion of the decoupling sub-assembly illustrating a carrier plate in more detail.

The carrier assembly 80 can comprise a carrier plate 400, and a carrier shell 402. With additional reference to FIGS. 5 and 6, the carrier plate 400 can comprise a plate member 408, a first reaction block 410, a second reaction block 412, a pair of bumpers 414 and a clutch stop 416. The plate member 408 can be unitarily formed of a suitable material, such as Nylon 4/6 and can include a spring groove 420, a spring stop aperture 422 and a rim 424. The first and second reaction blocks 410 and 412 and the bumpers 414 can be integrally and unitarily formed with the plate member 408. The clutch stop 416 can be received into the clutch stop aperture 422 and can be 25 configured to abut an end of the wrap spring clutch 84. In the particular example provided, the clutch stop 416 is a generally U-shaped steel stamping that is hardened.

Figure 7:
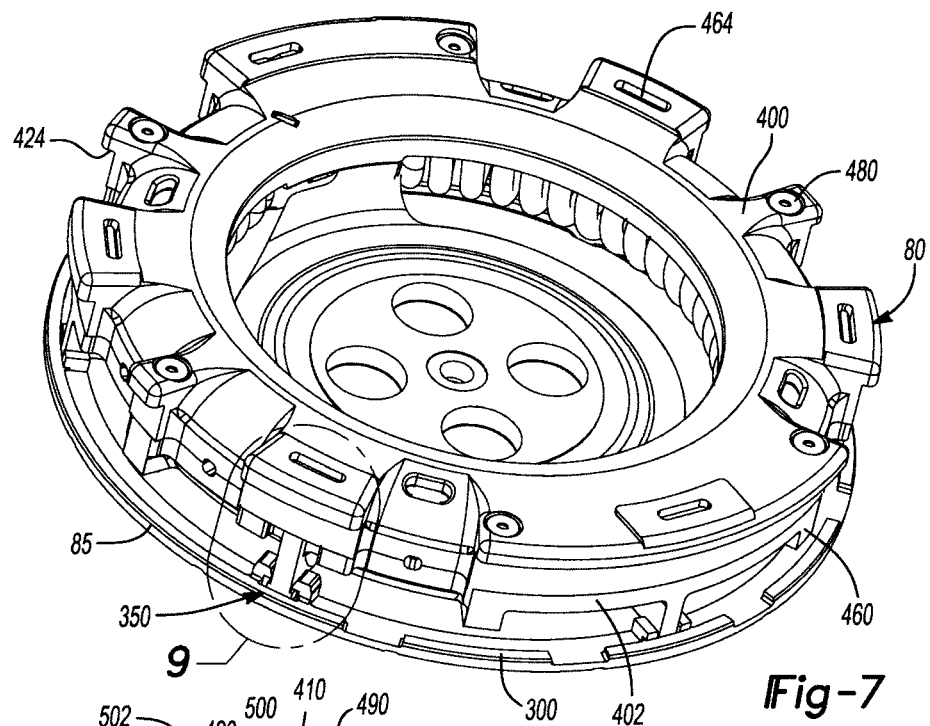
FIG. 7 is a front perspective view of a portion of the decoupling sub-assembly illustrating a carrier assembly and a spring limiter in more detail.

With reference to FIGS. 2, 4 and 7, the carrier shell 402 can be unitarily formed of a suitable material, such as Nylon 4/6. The carrier plate 400 and the carrier shell 402 can cooperate to define a generally toric interior cavity (i.e., an annular cavity having an interior surface 452 that is formed as a portion of an exterior surface of a torus) that is configured to receive the arcuate springs 82. The carrier plate 400 and the carrier shell 402 can be fixedly coupled to one another via a plurality of fasteners or rivets 480. In instances where a grease or an oil are employed to lubricate the generally toric interior surface 452, various apertures 464 can be formed through one or both of the plate member 400 and the carrier shell 402 to facilitate the flow of lubricant into the interior of the carrier shell 402.

Figure 8:
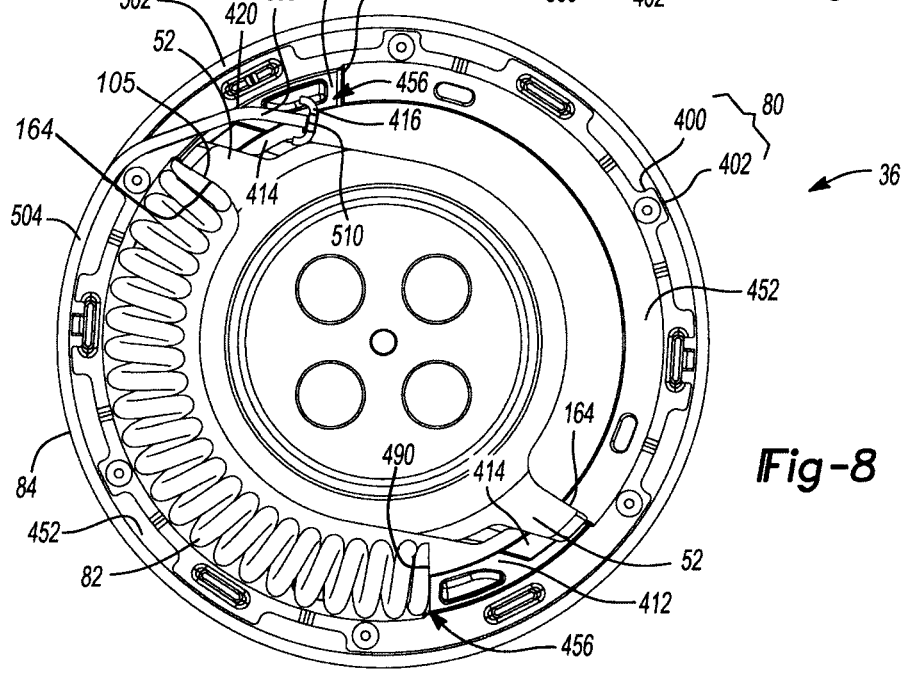
FIG. 8 is a section view of a portion of the decoupling sub-assembly.

With reference to FIG. 8, the first and second reaction blocks 410 and 412 can be formed of a desired material, such as Nylon 4/6 and can be received into the block mounting apertures 456 and fixedly coupled to one or both of the plate member 400 and the carrier shell 402. The first and second reaction blocks 410 and 412 can comprise a first end surface 490 that is configured to abut an end of an associated one of the arcuate springs 82. In the example provided, the spring groove 420 is formed into the first reaction block 410 and the spring groove 420 terminates at the spring stop aperture 422. Features can be formed onto/into one or both of the first and second reaction blocks 410 and 412 to aid in rotationally balancing the carrier assembly 80 and/or to reduce the mass of the carrier assembly 80.

The bumpers 414 can be configured to aid in maintaining alignment of the arcuate springs 82 along a predetermined plane that extends through the center of the carrier shell 402 perpendicular to its rotational axis and/or to cushion the hub tabs 52 when the hub tabs 52 are rotated fully in an unloading direction via the biasing force of the arcuate springs 82.

The arcuate springs 82 can be helical coil springs and in the particular example provided, are also compression springs. It will be appreciated that with various modifications to the hub 32 and the carrier 80, the arcuate springs 82 could be tension springs (e.g., the carrier assembly 80 could be formed with a generally U-shaped groove formed into its outer surface for receipt of the arcuate tension springs). A first end of the arcuate springs 82 can be engaged to a driving surface 164 of an associated one of the hub tabs 52, while an opposite end of the arcuate springs 82 can be abutted against an associated one of the first and second reaction blocks 410 and 412. The arcuate springs 82 can bias the hub 32 in a rotational direction such that the hub tabs 52 abut the bumpers 414.

It will be appreciated that the arcuate springs 82 can abut the generally toric interior surface 452 of the carrier assembly 80 and that if desired, a lubricant, such as an oil (e.g., conventional oil, synthetic oil, traction fluid) or a grease, can be employed to lubricate the generally toric interior surface 452. Additionally or alternatively, a coating or material may be applied to one or both of the generally toric interior surface 452 and the coils of the arcuate springs 82 to reduce friction and wear between the generally toric interior surface 452 and the arcuate springs 82.

With reference to FIGS. 2 and 8, the wrap spring clutch 84 can comprise a first or proximal end 500, a plurality of helical coils 502 and a second or free end 504. The wrap spring clutch 84 can be formed of a suitable material, such as a relatively hard spring steel wire, and can have an appropriate cross-sectional shape, such as a generally square or generally rectangular cross-sectional shape, in which the surfaces of the cross-sectional shape are generally flat or somewhat convex in shape. It will be appreciated, however, that the wire of the wrap spring clutch 84 could have any desired cross sectional shape, including a round cross-sectional shape. Moreover, the wire could be a "plain" wire, or could be coated with a desired coating (e.g., nickel plating) and/or can be lubricated with a desired lubricant, such as an oil (including conventional oils, synthetic oils and traction fluids) or a grease. The proximal end 500 can be shaped in a manner that is complementary to the shape of the spring groove 420 in the first reaction block 410. The proximal end 500 can terminate at an end face 510, which can be generally perpendicular to the longitudinal axis of the wire that forms the wrap spring clutch 84. The proximal end 500 can be received into the spring groove 420 such that the end face 510 abuts the spring stop 416. In the particular example provided, the end face 510 abuts the spring stop 416 over a generally flat surface that is perpendicular to the longitudinal axis of the wire that forms the proximal end 500 of the wrap spring clutch 84 such that the end face 510 contacts the spring stop 416 over the entire surface area of the end face 510, but those of skill in the art will appreciate that the spring stop 416 and/or the end face 510 may be constructed differently. The helical coils 504 can extend about the diameter of the carrier shell 402 such that the inside surface of the helical coils 504 can cooperate with the support surfaces 460 to roughly center the carrier shell 402 relative to the wrap spring clutch 84. Moreover, the rim 424 on the plate member 408 can abut an axial end of the wrap spring clutch 84 such that the wrap spring clutch 84 is positioned axially relative to the carrier assembly 80 in a desired manner (e.g., such that the carrier shell 402 is centered along the length of the wrap spring clutch 84). The helical coils 504 can be sized larger in diameter than the carrier shell 402 (i.e., such that the helical coils 504 do not directly contact the carrier shell 402), and somewhat larger in diameter than the clutch surface 60 (FIG. 3) on the cover 34*b* (FIG. 3) to thereby engage the clutch surface 60 (FIG. 3) with an interference fit.

The spring limiter 85 can be configured to limit axial growth or expansion of the wrap spring clutch 84 during operation of the decoupler 10, as well as to provide damping of the second end 504 of the wrap spring clutch 84. More specifically, the spring limiter 85 is sized so that the wrap spring clutch 84 will not elongate along the rotational axis of the decoupler 10 to an extent where the clearance between any adjacent pair of the helical coils 502 would be sufficiently large so as to permit buckling and/or bending of any individual one of the helical coils 502. Those of skill in the art will appreciate that the amount of axial elongation in the wrap spring clutch 84 that is permissible depends on several factors, including the magnitude of the load transmitted through the decoupler 10, the cross-sectional shape and dimensions of the wire that forms the wrap spring clutch 84, and the degree to which the wire that forms the helical coils 502 can tip or rotate about the longitudinal axis of the wire that forms the wrap spring clutch 84 such that portions of the helical coils 502 would contact the clutch surface 60 on a corner of the wire. As one example, the spring limiter 85 can be configured to limit the maximum amount by which the wrap spring clutch 84 can elongate in an axial direction to a dimension that is less than the width of the wire that forms the wrap spring clutch 84, such as a dimension between 0.1 to 0.8 times the width of the wire that forms the wrap spring clutch 84.

Figure 10:
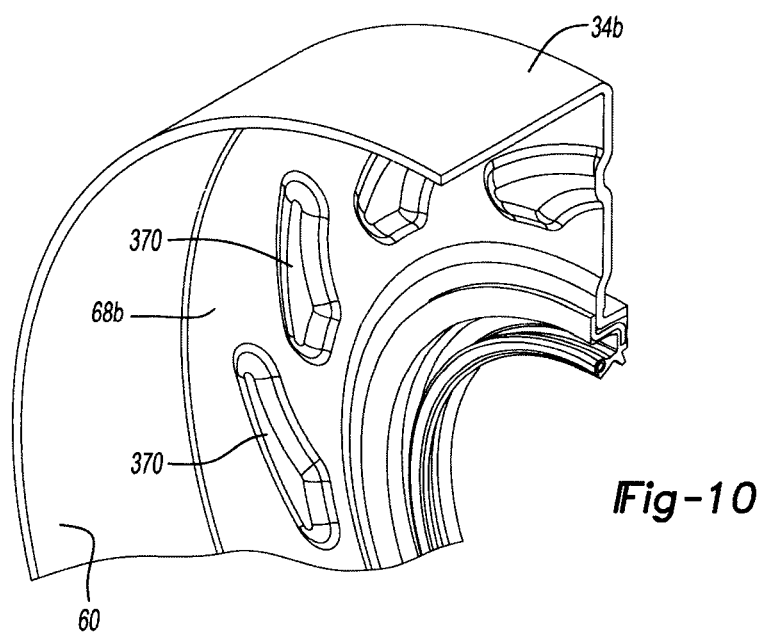
FIG. 10 is a perspective view of a portion of the decoupler of FIG. 1, illustrating a cover in more detail.

With reference to FIGS. 2, 7 and 10, the spring limiter 85 can include a helical spacer ramp 300 that can conform to the second end 504 of the wrap spring clutch 84. The helical spacer ramp 300 is discontinuous (i.e., formed in via a series of ramp portion) in the example provided, but those of skill in the art will appreciate that in the alternative, the helical spacer ramp 300 could be formed in a continuous manner. The helical spacer ramp 300 can terminate at an end face 302 (FIG. 2) that is configured to contact an axial end face 304 (FIG. 2) of the wire that forms the second end 504 of the wrap spring clutch 84 when the wrap spring clutch 84 has elongated to a maximum permitted extent.

Figure 9:
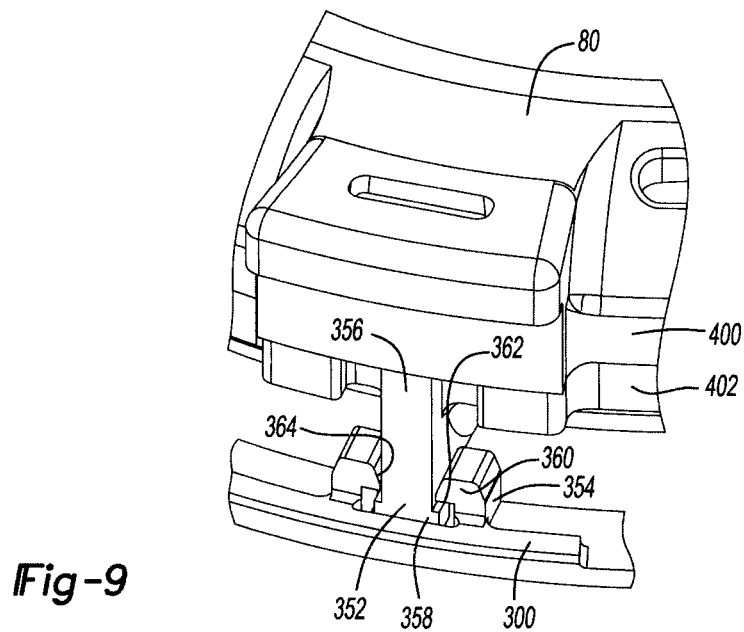
FIG. 9 is an enlarged portion of FIG. 7.

With reference to FIGS. 7 and 9, a plurality of latch mechanisms 350 can be employed to limit the amount by which the spring limiter 85 and the carrier assembly 80 can separate in an axial direction. Each latch mechanism 350 can include a lock tab 352 and a latch 354. The lock tab 352 can be fixedly coupled to a first one of the carrier assembly 80 and the spring limiter 85, such as the carrier assembly 80 in the example provided. The lock tab 352 can include a stem 356, which can be fixed to the carrier assembly 80 and extend toward the spring limiter 85, and a tab member 358 that can be fixedly coupled to the distal end of the stem 356. The latch 354 can be fixedly coupled to the other one of the carrier assembly 80 and the spring limiter, such as the spring limiter 85 in the example provided. The latch 354 is configured to receive and retain the tab member 358 in a manner that permits the tab member 358 to move in an axial direction so that the spacing between the carrier assembly 80 and the spring limiter 85 can range within a desired limit. The latch 354 can comprise a pair of locking fingers 360 that can be resiliently coupled to the spring limiter 85. Each locking finger 360 can form an abutting wall 362 on an interior side of the latch 354 and a beveled edge 364 on an exterior side of the latch 354. Contact between the tab member 358 and the beveled edges 364 of the locking fingers 360 of a latch 354 as the lock tab 352 is inserted to the latch 354 can cause the locking fingers 360 to resiliently spread apart to permit admittance of the tab member 358 to the latch 354. Once inside the tab member 358 is fully received into the latch 354, the locking fingers 360 can flex back into the state that is shown in FIGS. 7 and 9 so that the abutting walls 362 are interposed in-line with the tab member 358 to thereby resist withdrawal of the tab member 358 from the latch 354.

With reference to FIGS. 2 and 3, a bearing B can be received between the inner wall 64 of the pulley 34b and the spacer body 40b of the second spacer portion 30b to support the drive member 34 for rotation relative to the hub spacer 30. In some embodiments, the bearing B may be disposed radially in-line with the arcuate springs 82 and the portion of the hub tabs 52 that contacts the arcuate springs 82. More particularly, the bearing B can include a plurality of bearing balls BB that can be positioned relative to the arcuate springs 82 such that a plane that extends through a centerline of the bearing balls BB extends through a longitudinal centerline of the arcuate springs 82. In some embodiments, the bearing B may be radially in-line with the center of the grooved portion of the pulley 34a. In some embodiments, the bearing B may be radially in-line with both the center of the grooved portion of the pulley 34a and with the arcuate springs 82. Other positions for the bearing B are also possible.

In some embodiments, the bearing B may be a sealed bearing, in which case, the lip seal 70 may be omitted from the decoupler 10.

Each of the hub tabs 52 can be configured such that they extend across a corresponding axial end 105 of one of the arcuate springs 82 along a path that intersects a center axis AS (best shown in FIG. 15B) of the corresponding one of the arcuate springs 82 such that contact between each hub tab 52 and its corresponding arcuate spring 82 occurs over an area that includes the center of the end of the arcuate spring 82.

Returning to FIG. 2, the decoupling sub-assembly 36 is operable in a first mode for transmitting rotary power from the hub 32 to the pulley 34a. When rotary power in a first rotational direction is input to the decoupler 10 through the hub spacer 30 and the hub 32, rotary power is transmitted from the hub tabs 52 through the arcuate springs 82 and into the carrier assembly 80. Rotary power is input to the wrap spring clutch 84 from the carrier assembly 80 via the spring stop 416 acting on the first end 500 of the wrap spring clutch 84. Rotary power received by the wrap spring clutch 84 is transmitted longitudinally long the wire that forms the wrap spring clutch 84 and is output to the cover 34b through contact between the helical coils 502 and the clutch surface 60. The rotary power received by the cover 34b is transmitted to the pulley 34b. We have found that the inside surface of the outer wall 64b need not be masked when the cover 34b is painted as any paint on the inside surface of the outer wall 64 is removed from the clutch surface 60 very shortly after the decoupler 10 is in operation.

The decoupling sub-assembly 36 is further operable in a second mode in which the wrap spring clutch 84 disengages (partly or wholly) or lessens its engagement with the clutch surface 60 to permit the driver 34 to overrun the remainder of the decoupler 10 in the first rotational direction.

With reference to FIGS. 2, 4 and 10, lubricant within the cavity 67 will tend to move radially outwardly due to centrifugal force when the decoupler 10 operates. It can be desirable in some situations to direct lubricant toward or onto the interior surface 452 of the carrier assembly 80 to lubricate the interface between the arcuate springs 82 and the carrier assembly 80. It may also be desirable in some situations to direct lubricant towards the bearing B and the lip seal 73. In situations where the lubricant is an oil or another relatively low viscosity fluid, a plurality of fluid directing vanes 370 can be coupled to the cover 34b and configured to direct the oil or other fluid in a radially inward direction when the decoupling sub-assembly 36 operates in the second (overrunning) mode to direct the oil to or onto the interior surface 452, the bearing B and/or the lip seal 73. In the example provided, the fluid directing vanes 370 are integrally formed with the rear wall 68b of the cover 34b when the cover 34b is stamped.

In the embodiments described above, the hub 32 is described as an input member, receiving rotary power from the crankshaft 18, and the driver 34 is described as an output member. In other embodiments, the driver 34 may be the input member and the hub 32 may be the output member.

Figure 11:
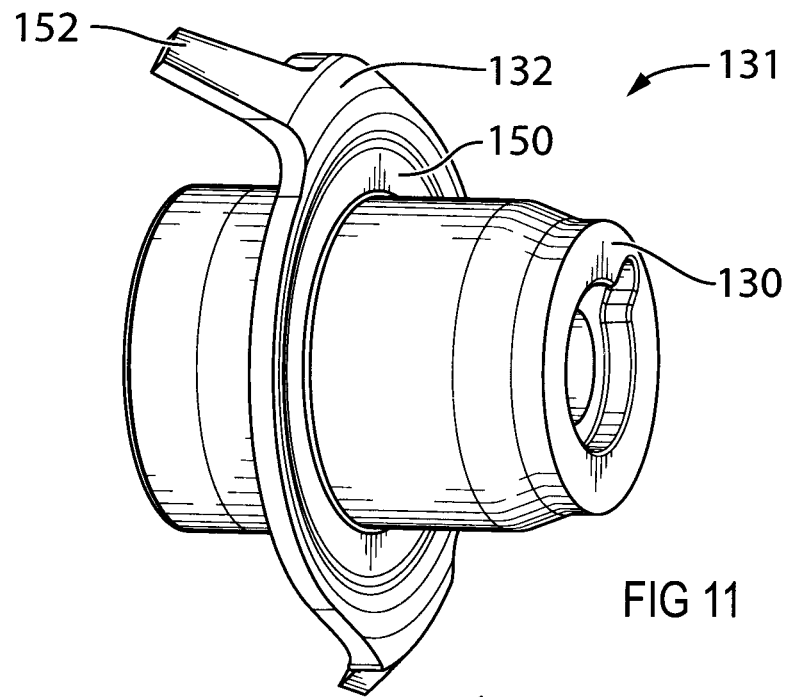
FIG. 11 is a perspective view of an alternative hub assembly to that which is shown in FIGS. 2, 3 and 4.
Figure 12:
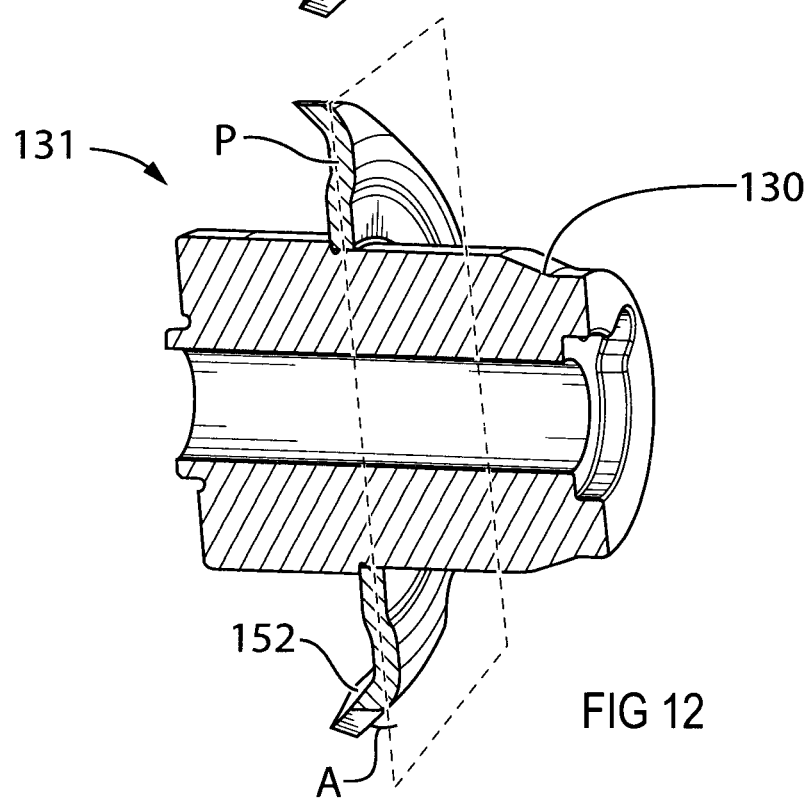
FIG. 12 is a sectional view of the hub assembly shown in FIG. 11.

Another embodiment of the hub assembly is shown at 131 in FIGS. 11 and 12, which can be used in place of the hub assembly 31 in the decoupler 10. The hub assembly 131 comprises a hub 132 and a hub spacer, or shaft portion, shown at 130. The hub spacer 130 is a contiguous member that extends through an aperture 134 in the hub 132. As a result, there is no need to provide gaskets to seal between the joint between the hub 132 and hub spacer 130, since the joint does not represent a leakage path for lubricant out of the decoupler 10. The hub 132 may be joined to the hub spacer 130 by any suitable means, such as by a weld. The hub 132 may have a hub body which defines the aperture 134, and hub tabs 152, which extend from the plane of the hub body 150 at a selected angle A (e.g. about 45 degrees) and which may be similar to hub tabs 52 in that each hub tab 152 is positioned to extend across an end of one of the arcuate helical coil springs 82 while passing through the center of the end of the spring 82. The plane of the hub body 150 is shown at P in FIG. 12.

The hub 132 may be made from a suitable material such as a steel and may have any suitable thickness, such as about 3.5 mm. The entire hub 132 may be hardened (e.g. nitrided). Alternatively, to facilitate welding of the hub 132 to the hub spacer 130, at least an inner portion of the hub body 150 that defines the aperture 134 may remain unhardened, while the hub tabs 152 and optionally an outer portion of the hub body 150 may be hardened. The hub spacer 130 may itself be formed by turning a piece of bar. The piece of bar may be provided from a length of bar stock or from a forging or by any other suitable process. The piece of bar may be turned while it is still part of a length of bar stock, or after it has been cut from a length of bar stock. It will be noted that turning a piece of bar to provide a hub spacer, and stamping a hub and mounting the stamped hub to the hub spacer is less expensive than machining a one-piece hub and hub spacer from a single blank. This is because it is relatively laborious to machine the necessary amount of material from a blank that has the diameter of the hub 132 to form a one-piece hub and hub spacer, whereas it is less laborious to turn a piece of bar that has an initial diameter that is close to the finished diameter of the hub spacer 130.

Thus, a novel method for forming a hub assembly may be provided as follows:

a. stamp a hub (e.g. hub 132) that includes a hub body (e.g. hub body 150) that defines a plane and that defines an aperture (e.g. aperture 134), and at least one hub tab (e.g. hub tabs 152) that extends from the plane of the hub body at a selected angle;

b. turn a hub spacer (e.g. hub spacer 130) from a piece of bar; and c. fixedly join the hub and the hub spacer together (e.g. by welding), such that the hub spacer extends through the aperture in the hub.

Figure 13:
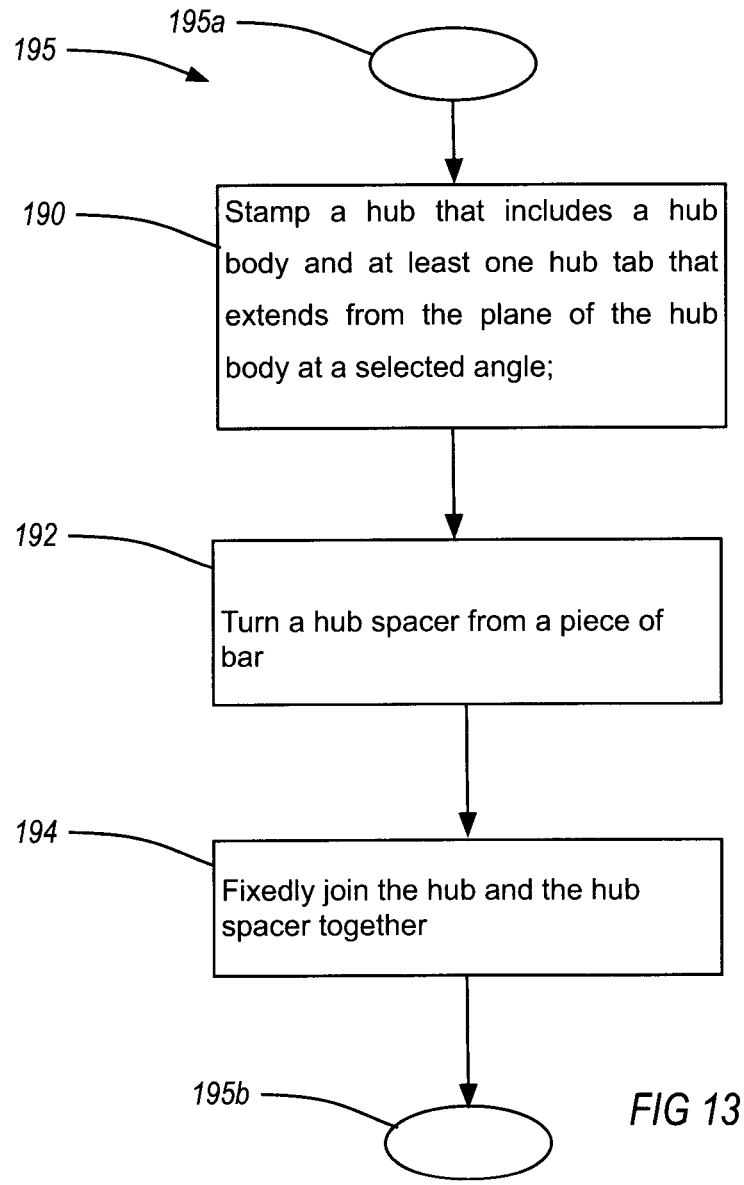
FIG. 13 is a flow diagram illustrating a method of making the hub assembly shown in FIG. 11.

Steps a., b., and c. are shown at 190, 192 and 194 in FIG. 13. The method is shown at 195. The start of the method is shown at 195a and the end is shown at 195b.

Figure 14:
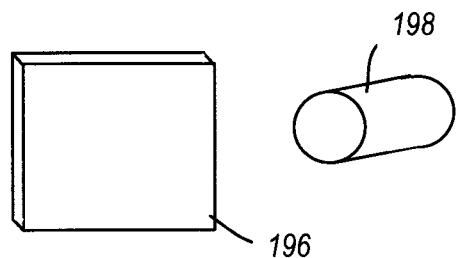
FIG. 14 shows the initial components that are worked to form the hub assembly shown in FIG. 11.

A blank that may be stamped to form the hub in step a, and the piece of bar that may be used to form the hub spacer are shown together at 196 and 198 respectively in FIG. 14. While the blank is shown as having the rough size of the hub itself, it is alternatively possible for the blank to be a large sheet of steel plate or the like that is fed into a stamping machine which stamps a plurality of hubs sequentially therefrom.

It will be understood by a person skilled in the art that the order of the steps shown above is not to be taken as limiting. For example, step a. need not occur before step b.—it may occur after, or even simultaneously with step b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A decoupler, comprising:
a driver having a clutch surface;
a hub that is disposed within the driver; and
at least one torsionally-compliant member and a wrap spring clutch that are disposed in series between the hub and the clutch surface,
wherein the driver comprises a pulley and a cover that is received into a cavity in the pulley, wherein the pulley has a belt-engagement surface and is fixedly coupled to the cover for rotation therewith, the cover defining the clutch surface;
wherein one of the pulley and cover has a first surface with a securing feature comprising at least one of knurls and reeds, formed thereon that engages a second surface on the other one of the pulley and cover in a press fit manner.

2. A decoupler as claimed in claim 1, wherein the clutch surface is painted.

3. A decoupler as claimed in claim 1, wherein the decoupler further comprises a liquid lubricant and wherein the cover comprises a plurality of vanes that are configured to direct the liquid lubricant in a radially inward direction when the cover rotates in a predetermined rotational direction relative to the hub.

4. A decoupler as claimed in claim 1, wherein the cover has an inwardly facing surface that faces the cavity, and wherein the decoupler further comprises a cover lip seal that seals an aperture between the cover and the hub, wherein the lip seal has a flange that engages the inwardly facing surface to prevent the lip seal from being passed through the aperture.

5. A decoupler as claimed in claim 1, wherein the cover is hardened.

6. A decoupler as claimed in claim 1, wherein the at least one torsionally compliant member includes a plurality of arcuate springs.

7. A decoupler as claimed in claim 6, wherein the hub includes a plurality of hub tabs, each hub tab extending across a corresponding one of the arcuate springs along a path that intersects a centerline of the corresponding one of the arcuate springs.

8. A decoupler as claimed in claim 6, wherein the hub is a stamping and is part of a hub assembly that includes a shaft member to which the hub is mounted.

9. A decoupler, comprising:
a driver defining a clutch surface;
a hub that is disposed within the driver; and
a torsionally-compliant member and a one-way clutch that are disposed in series in a torque path between the hub and the driver, the one-way clutch permitting rotary power to be transferred from one of the driver and the hub to the other one of the driver and the hub in a first rotary direction, the one-way clutch also permitting the other one of the driver and the hub to overrun the one of the driver and the hub in the first rotary direction, the one-way clutch having a carrier assembly, a wrap spring clutch and a spring limiter, the wrap spring clutch being formed of wire and having a first end, a plurality of helical coils, and a second end that is opposite the first end, the first end is coupled to the carrier assembly for rotation therewith, the plurality of helical coils being engaged to the clutch surface, the spring limiter being configured to limit axial elongation of the wrap spring clutch by limiting movement of the second end, wherein the spring limiter is non-rotatably but axially movably coupled to the carrier assembly,
wherein a plurality of latch mechanisms couple the spring limiter to the carrier assembly.

10. A decoupler as claimed in claim 9, wherein each latch mechanism includes a lock tab and a latch that is engaged to the lock tab.

11. A decoupler as claimed in claim 10, wherein each lock tab comprises a stem and a tab member, a first end of the stem being fixedly coupled to one of the carrier assembly and the spring limiter, the tab member being fixed to a second, opposite end of the stem and being received into a corresponding one of the latches.

12. A decoupler as claimed in claim 11, wherein each latch comprises a plurality of fingers that are fixedly coupled to the other one of the carrier assembly and the spring limiter.

13. A decoupler as claimed in claim 12, wherein the fingers define abutting walls and wherein contact between the tab members and abutting walls limits axial movement of the spring limiter in a direction away from the carrier assembly.

14. A decoupler, comprising:
a driver having a clutch surface;
a hub that is disposed within the driver; and
at least one arcuate spring and a wrap spring clutch that are disposed in series between the hub and the clutch surface, wherein the at least one arcuate spring has a generally circular cross-sectional shape and having a center axis
wherein the hub includes a hub body defining a plane and at least one hub tab extending away from the plane at an angle that is less than 90 degrees, wherein each hub tab extends across an axial end of a corresponding one of the at least one arcuate spring along a path that intersects the center axis of the corresponding one of the at least arcuate spring.

15. A decoupler as claimed in claim 14, wherein the at least one hub tab extends away from the plane at about 45 degrees.

\* \* \* \* \*